(12) United States Patent
Essawy

(10) Patent No.: US 9,797,702 B2
(45) Date of Patent: Oct. 24, 2017

(54) CONTROL SURFACE SKEW DETECTION SYSTEMS

(71) Applicant: Rosemount Aerospace Inc., Burnsville, MN (US)

(72) Inventor: Magdi A. Essawy, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 607 days.

(21) Appl. No.: 14/180,997

(22) Filed: Feb. 14, 2014

(65) Prior Publication Data

US 2015/0159988 A1    Jun. 11, 2015

Related U.S. Application Data

(60) Provisional application No. 61/912,718, filed on Dec. 6, 2013.

(51) Int. Cl.
*G01B 7/30* (2006.01)
*G01B 7/00* (2006.01)
(Continued)

(52) U.S. Cl.
CPC ......... *G01B 7/003* (2013.01); *B64D 45/0005* (2013.01); *G01B 7/30* (2013.01);
(Continued)

(58) Field of Classification Search
CPC .................................. G01B 7/30; G01B 7/003
See application file for complete search history.

(56) References Cited

U.S. PATENT DOCUMENTS

| 5,018,982 A | 5/1991 | Speraw et al. |
| 5,375,476 A * | 12/1994 | Gray ............... E21B 47/065 |
| | | 73/152.56 |

(Continued)

FOREIGN PATENT DOCUMENTS

| EP | 0922633 A2 | 6/1999 |
| EP | 2044389 A1 | 4/2009 |

(Continued)

OTHER PUBLICATIONS

Dirjish, Mat, "Position Sensors Handle Hostile Environments", Defense Electronics, Mar./Apr. 2011, p. S31.

(Continued)

*Primary Examiner* — Jermele M Hollington
*Assistant Examiner* — Feba Pothen
(74) *Attorney, Agent, or Firm* — Locke Lord LLP; Scott D. Wofsy; Daniel J. Fiorello

(57) ABSTRACT

A sensor package for sensing rotational positional data includes a stack of separated printed circuit boards that includes a first position target printed board, a second printed circuit board having a rotary sensor and a third printed circuit board having power supply components. The sensor package is included in a skew detection system for an aircraft control system, which includes a control surface having opposed first and second ends. A first drive mechanism is operatively connected to the first end of the control surface by a first rack and pinion assembly and a second drive mechanism is operatively connected to the second end of the control surface by a second rack and pinion assembly. Each rack and pinion assembly includes a respective sensor package operatively connected to the pinion thereof. A processing component is operatively connected to both sensor packages to determine presence of skew in the control surface.

8 Claims, 5 Drawing Sheets

(51) Int. Cl.
  *G01D 5/20* (2006.01)
  *G01D 5/22* (2006.01)
  *B64D 45/00* (2006.01)
(52) U.S. Cl.
  CPC ............. *G01D 5/20* (2013.01); *G01D 5/2266* (2013.01); *B64D 2045/001* (2013.01)

(56) References Cited

U.S. PATENT DOCUMENTS

| | | | |
|---|---|---|---|
| 5,680,124 | A | 10/1997 | Bedell et al. |
| 5,686,907 | A | 11/1997 | Bedell et al. |
| 5,802,728 | A | 9/1998 | Karnick et al. |
| 6,299,108 | B1 | 10/2001 | Lindstrom et al. |
| 6,382,566 | B1 | 5/2002 | Ferrel et al. |
| 6,466,141 | B1 * | 10/2002 | McKay ............... B64C 13/00 244/213 |
| 6,483,436 | B1 | 11/2002 | Emaci et al. |
| 6,534,970 | B1 | 3/2003 | Ely et al. |
| 8,129,985 | B2 | 3/2012 | Lee et al. |
| 2006/0153482 | A1 * | 7/2006 | Koike ............... B60B 3/02 384/448 |
| 2006/0202584 | A1 * | 9/2006 | Jore ............... H02K 21/24 310/179 |
| 2007/0024387 | A1 * | 2/2007 | Sandacci ............... H01P 1/068 333/24 R |
| 2007/0194781 | A1 | 8/2007 | Zhitomirskiy |
| 2008/0122166 | A1 * | 5/2008 | Fukube ............... B65H 7/14 271/265.01 |
| 2011/0290044 | A1 | 12/2011 | Hubberstey et al. |
| 2013/0120957 | A1 * | 5/2013 | Werner ............... H05K 9/0032 361/818 |

FOREIGN PATENT DOCUMENTS

| | | |
|---|---|---|
| EP | 2579001 A1 | 4/2013 |
| WO | WO 2006/079793 | 3/2006 |

OTHER PUBLICATIONS

Extended European Search Report dated May 11, 2015 issued on corresponding European Patent Applicaiton No. 14196824.8.

* cited by examiner

CONTROL SURFACE SKEW DETECTION SYSTEMS

CROSS-REFERENCE TO RELATED APPLICATIONS

This application claims the benefit of and priority to U.S. Provisional Patent Application No. 61/912,718 filed Dec. 6, 2013, which is incorporated by reference herein in its entirety.

BACKGROUND OF THE INVENTION

1. Field of the Invention

The present disclosure relates to skew detection systems for aircraft control surfaces, and more particularly to sensor packaging for the skew detection system environments.

2. Description of Related Art

Contactless position sensing (CLPS) is used in a number of positional sensing applications, such as motor position feedback control and/or commutation, cam and crank shaft position sensing for controlling ignition timing, misfire detection, engine speed monitoring, robotics, machine tool position control and the like. Certain conventional applications are described in U.S. Pat. Nos. 6,534,970 and 8,129,985. However, CLPS has not previously been used in aircraft control applications, such as a skew detection system for aircraft control surfaces due to difficulties such as CLPS sensitivity to electromagnetic interference (EMI), and other environmental factors such as humidity, temperature variation, lightening, dust, oil, and debris particles.

Skew can have a detrimental effect on aircraft aerodynamics. It occurs due to non-symmetric movement of the two drive mechanisms on a single control surface, such as slats or flaps. This non-symmetric movement may be caused by a number of factors including disconnects between the drive mechanism and the control surface, or by jams in the drive mechanism. Various contact systems are used in the industry to detect skew and correct it such as a flap drive mechanism where a carriage moves down a track as the control surface is deployed. However, such systems tend to have limited accuracy and can be overly complex in application with constrained space, such as inside an airframe structure. Moreover, conventional track mechanisms are more prone to wear than a contactless system.

Such conventional methods and systems for skew detection have generally been considered satisfactory for their intended purpose. However, there is still a need in the art for improved systems with reduced spatial requirements and improved accuracy. The present disclosure provides a solution for these problems.

SUMMARY OF THE INVENTION

A sensor package for sensing rotational positional data includes a stack of separated printed circuit boards that includes a first position target printed circuit board (PCB), a second PCB having a rotary sensor, and a third PCB having power supply components. The sensor package can include a Faraday cage structure that surrounds the stack of printed circuit boards. Design air gaps including the gap between the position target PCB and the rotary sensor PCB and keep out distances between sensor coils and surrounding metallic and electrical components, are calculated to reduce signal electromagnetic interference and increase signal-to-noise ratio. Four metallic standoffs can be included to maintain design air gaps.

In certain embodiments, the rotary sensor can include a metallic target or a resonant sensor antenna PCB, i.e. a resonant target built of a coil made of copper traces on a PCB connected in series with a capacitor with a calculated value. The rotary sensor can be configured to rotate between 0 and 360 degrees. In certain embodiments, the third PCB includes processing circuits designed to receive very small position sensor signals and generate accurate and linear positional estimates. The sensor package can include multiple sensing channels installed on the same rotating shaft, e.g., additional printed circuit boards, to provide higher reliability position estimates achieved through signal route redundancy.

A skew detection system for an aircraft control system includes, inter alia, a control surface including opposed first and second ends. A first drive mechanism is operatively connected to the first end of the control surface by a first rack and pinion assembly. Similarly, a second drive mechanism is operatively connected to the second end of the control surface by a second rack and pinion assembly. Each rack and pinion assembly includes a respective sensor package as described above, that is operatively connected to sense rotation using a gear with a designed gear reduction ratio for the pinion thereof. A processing component is operatively connected to both sensor packages to determine presence of skew in the control surface based on rotation of the pinions and communicate a skew value to other aircraft systems as needed.

The skew in the control surface can be computed by the processing component using translational data of the first and second sensor packages based on rotation data from the sensor packages. In certain embodiments, the processing component includes a receiving component for receiving positional data of the first and second sensor packages and a computing component for computing the differential in the positional data to determine presence of skew. In some embodiments, the processing component is included in the first sensor package and the first sensor package is operatively connected to the second sensor package to receive sensor data therefrom.

In accordance with certain embodiments, the rotary sensor of each sensor package is driven by a respective drive mechanism and the first and the second printed circuit boards are static and fixed to an airframe. The rotary sensor of each sensor package can be configured to rotate between 0 and 360 degrees. The skew detection system can also include a warning system operatively connected to the processing component wherein a warning is initiated if a computed skew measurement exceeds a predefined threshold.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1A:
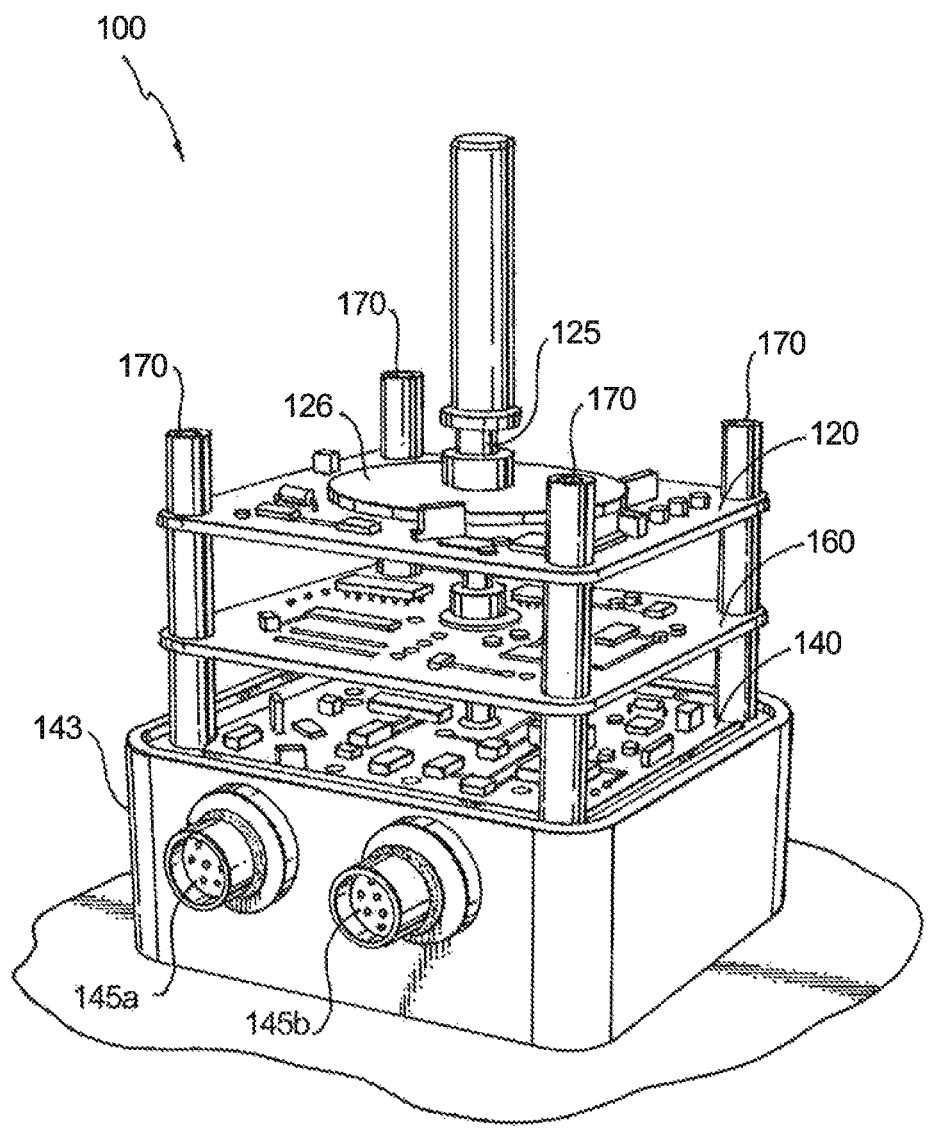
FIG. 1a is a perspective view of an exemplary embodiment of a sensor package in accordance with the present disclosure, showing the location of the stack of separated printed circuit boards.
Figure 1B:
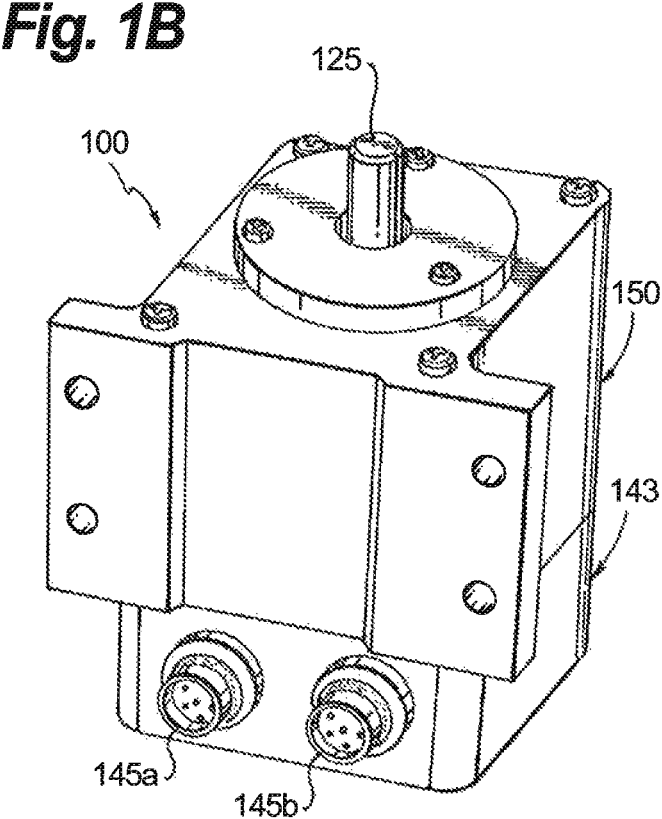
FIG. 1b is a perspective view of the sensor package of FIG. 1a, showing the Faraday cage structure surrounding the printed circuit boards.

Reference will now be made to the drawings wherein like reference numerals identify similar structural features or aspects of the subject disclosure. For purposes of explanation and illustration, and not limitation, a partial view of an exemplary embodiment of the sensor package in accordance with the disclosure is shown in FIGS. 1a and 1b and is designated generally by reference character 100. Other embodiments of sensor packages and skew detection systems using the sensor packages in accordance with the disclosure, or aspects thereof, are provided in FIGS. 2-5, as will be described. The systems and methods described herein can be used to provide skew detection in aircraft control surfaces such as slats and flaps.

FIG. 1a illustrates an example of a sensor package 100 for sensing rotational positional data with a stack of separated printed circuit boards. Included in the sensor package 100 are a PCB 120 having a rotary sensor shaft 125 connected to a position target PCB 126 and a third PCB 140 having power supply components (not shown). Mechanical casing 145 is included around the power supply components. A complete mechanical package is shown in the sensor package 100 of FIG. 1b in addition to the end of the mechanical rotary sensor shaft 125 and electrical connectors 145a, 145b, a Faraday cage structure 150 surrounds the stack of printed circuit boards. This mechanical package provides the necessary sensor environmental isolation and protection required for proper operation of the sensor in such environments as mentioned above. To provide all necessary air gaps and keep out zones for proper operation of the sensor package 100 and to assist improve ease of assembly, four vertical metallic standoffs 170 are provided to hold the board stack as shown in FIG. 1a. The standoffs 170 hold all air gaps and keep out distances, such as between the position target PCB 126, fixed sensing coils on the PCB 120 and other surrounding mechanical structure 150, 145 and electrical components and power supplies on PCB 140.

The rotary sensor 125 senses rotational position data of a position target. As shown in FIG. 1a, the rotary sensor shaft 125 is connected to a resonant sensor antenna (target) on a PCB 126. The rotary sensor shaft 125 is configured to rotate between 0 to 360 degrees. Sensor excitation signal and receiving coils are located on the sensor PCBs 120 and 160 where coupling is enhanced, e.g., maximized in the signal path between the excitation coils to the receive coils through the target coils and reduced, e.g., minimized otherwise. Processing means are collocated with the excitation and receive coils on PCBs 120 and 160 where very small positional signals coupled into the receive coils are evaluated and translated to a position measurement with accuracy and linearity. The third PCB 140 provides the power supply and electrical protection circuitry for both top and bottom channels, e.g., printed circuit boards 120 and 140.

The two sensor channels 120, 160 are connected to the same shaft 125 and consequently provide two redundant measurements of the same position for better sensor measurement reliability. A comparison between the two channels on each sensor 120, 160 is used to confirm sensor measurement reliability. For a reliable sensor measurement both channels should provide the same position measurement within a small error tolerance. When the two-channel position measurement deviation exceeds this error tolerance, the sensor measurement is no longer reliable and a position measurement and skew warning flag can be communicated to the aircraft computer for further action.

Figure 2:
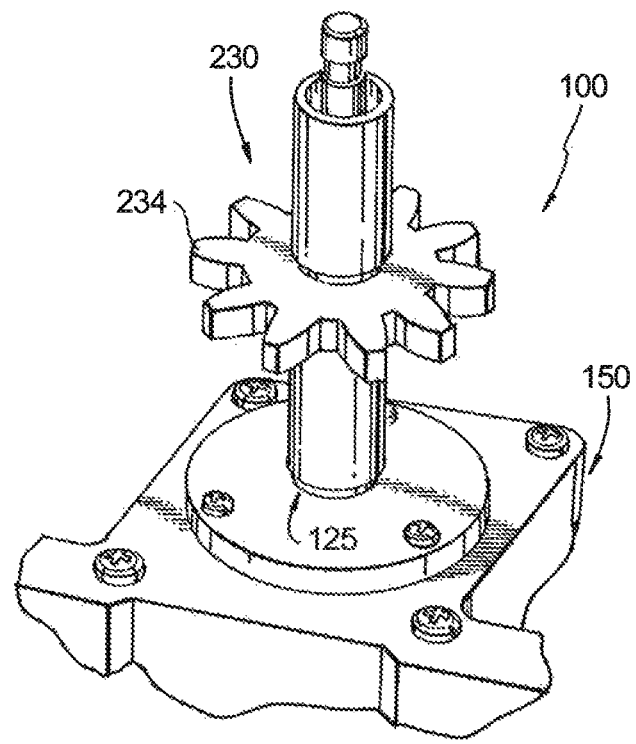
FIG. 2 is a perspective view the sensor package of FIG. 1a and a pinion assembly for the translation from linear motion to rotary motion for the skew detection system.
Figure 3:
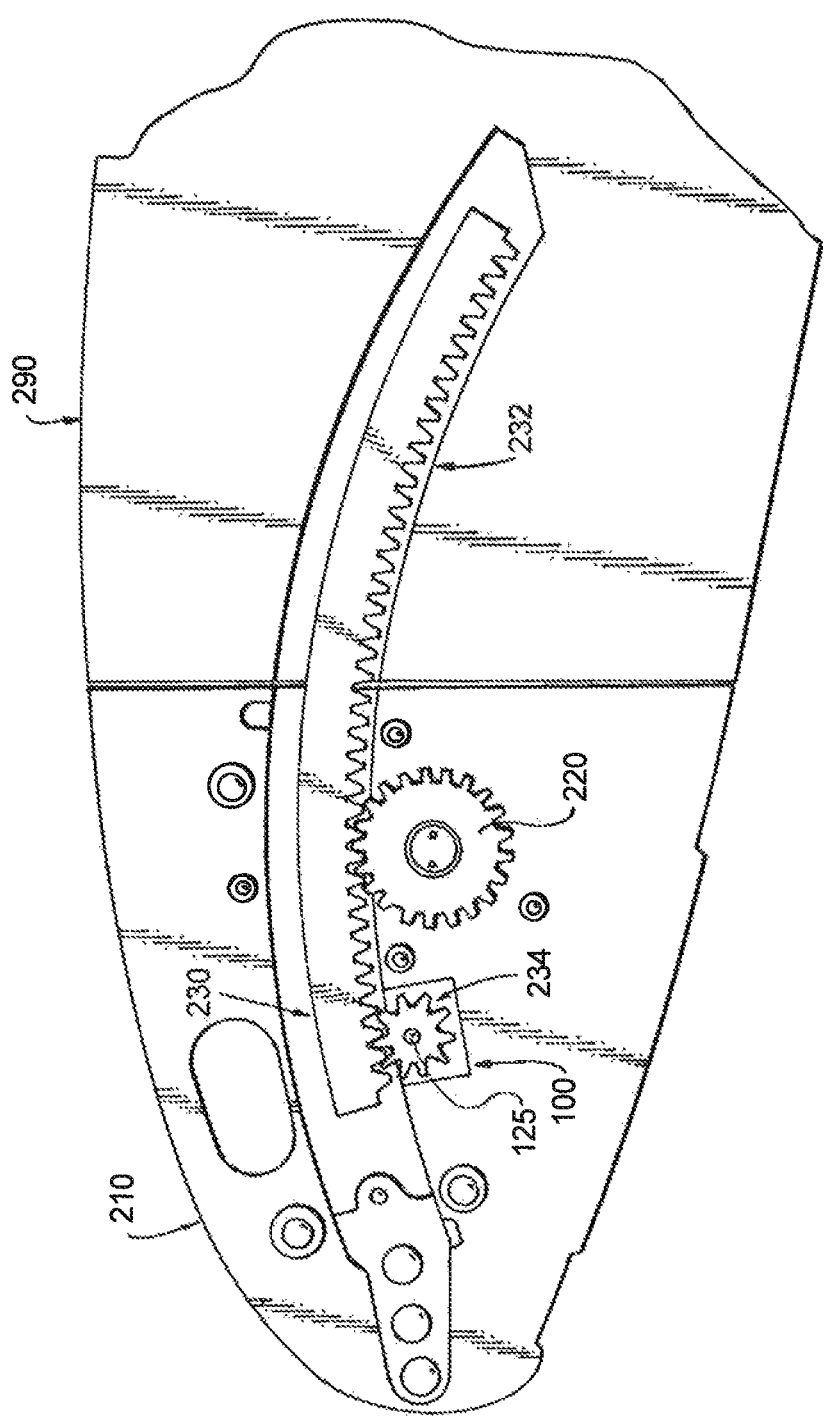
FIG. 3 is a cross-sectional side elevation view of an exemplary embodiment of the skew detection system in accordance with the present disclosure showing the control surface connected to the rack and pinion assembly and the rotary position measurement gear.

Referring to FIG. 2, the sensor package 100 is operatively connected to a motion reduction gear 234 of the rack and pinion assembly 230 for use in a skew detection system for an aircraft control system. In particular, the rotary sensor 125 is operatively connected in the gear 234 to sense rotation thereof. Referring to FIG. 3, the rack 232 of the rack and pinion assembly is operatively connected to a drive mechanism 220. The drive mechanism 220 is also operatively connected to a control surface 210. The rotary sensor 125 is driven by the drive mechanism 220 and the first PCB 120 and the second PCB 140 are static and fixed to the airframe 290.

Figure 4:
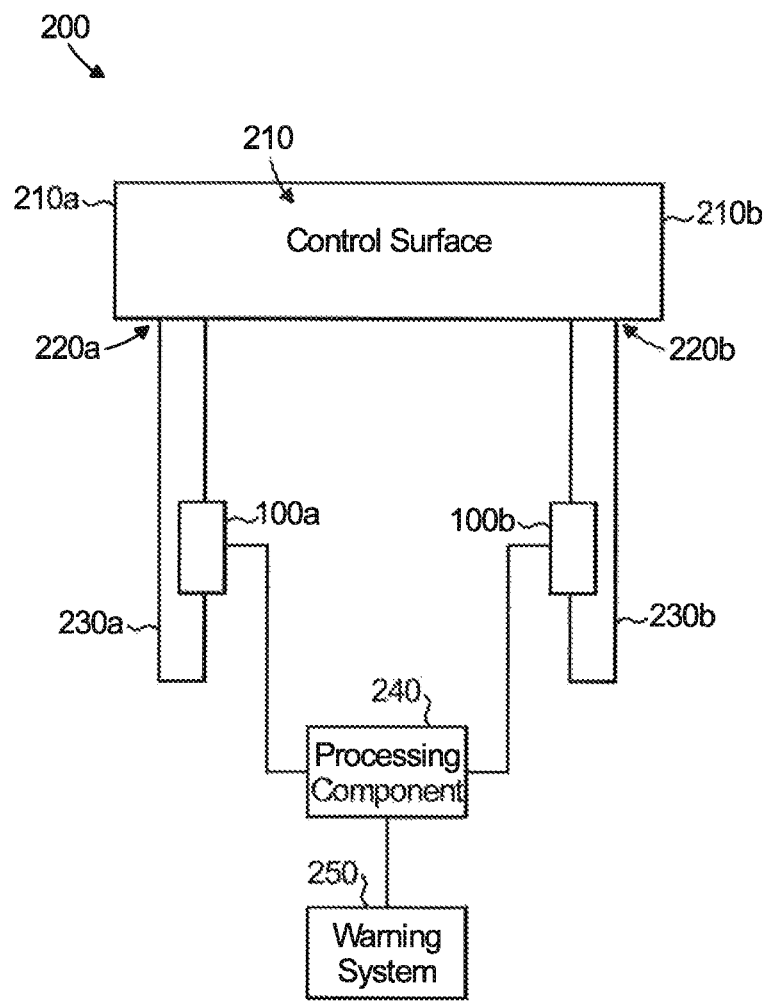
FIG. 4 is a schematic top plan view of the skew detection system of FIG. 3, showing the sensor packages on two sides connected to a processing component.
Figure 5:
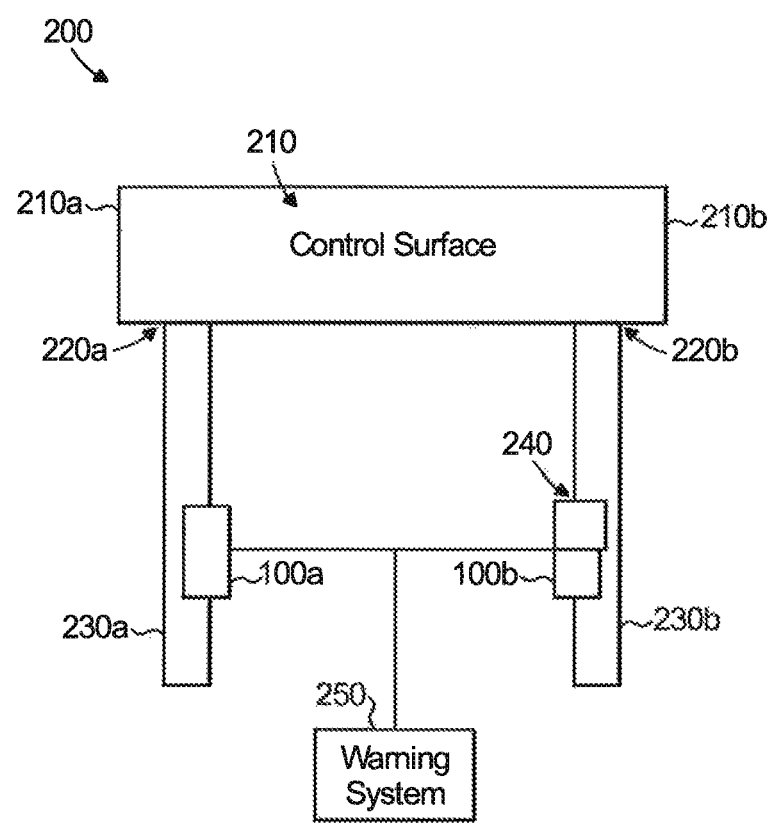
FIG. 5 is a schematic top plan view of another exemplary embodiment of the skew detection system in accordance with the present disclosure, showing the processing component included in one of the sensor packages.

FIG. 4 schematically illustrates a skew detection system 200 in accordance with the present disclosure. A control surface 210 has opposed first and second ends 210a, 210b. A first drive mechanism 220a is operatively connected to the first end of the control surface 210a by a first rack and pinion assembly 230a. Similarly, a second drive mechanism 220b is operatively connected to the second end 210b of the control surface by a second rack and pinion assembly 230b. First and second sensor packages 100a, 100b are operatively connected to respective rack and pinion assemblies 230a, 230b to detect rotation of the respective pinions 234a, 234b.

A processing component 240 is operatively connected to both sensor packages 100a, 100b to determine presence of skew in the control surface 210 based on rotation of the pinions. The processing component 240 computes skew using translational data derived from the rotation data from the first and second sensor packages 100a, 100b. The processing component 240 has a receiving component for receiving positional data of the first and second sensor packages 100a, 100b and a computing component for computing the differential in the positional data of the first and second ends 210a, 210b to determine presence of skew. As shown in FIG. 4, the processing component 240 is operatively connected to, but located separate from, both sensor packages 100a, 100b. In the embodiment shown in FIG. 5, the processing component 240 is included in the first sensor package 100a, e.g., on one of the printed circuit boards described above, and the first sensor package 100a is operatively connected to the second sensor package 100b to provide the skew between first and second ends 210a, 210b to the processing component 240. In both of the embodiments of FIGS. 4-5, a warning system 250 is operatively connected to the processing component 240. The warning system 250 initiates a warning if a computed skew measurement exceeds a predefined threshold.

The methods and systems of the present disclosure, as described above and shown in the drawings, provide for a skew detection system with superior properties including contactless sensing with EMI and environmental protection and reduced spatial requirements. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A skew detection system for an aircraft control system comprising:
   a control surface including opposed first and second ends;
   a first drive mechanism operatively connected to the first end of the control surface by a first rack and pinion assembly and a second drive mechanism operatively connected to the second end of the control surface by a second rack and pinion assembly, wherein each rack and pinion assembly includes a respective sensor package operatively connected to sense rotation of the pinion thereof, the sensor package comprising:
      a stack of separated printed circuit boards including:
         a first position target printed board;
         a second printed circuit board having a rotary sensor; and
         a third printed circuit board having power supply components; and
   a processing component operatively connected to both sensor packages to determine presence of skew in the control surface based on rotation of the pinions.

2. A skew detection system as recited in claim 1, wherein skew in the control surface is computed using translational data of the first and second sensor packages as a result of translating linear motion to a 0 to 360 degree rotational motion.

3. A skew detection system as recited in claim 1, wherein the processing component includes a receiver component for receiving positional data of the first and second sensor packages and a computing component for computing the differential in the positional data to determine presence of skew.

4. A skew detection system as recited in claim 1, wherein the processing component is included in the first sensor package, and the first sensor package is operatively connected to the second sensor package to receive a rotary position of each end of the control surface and compute skew.

5. A skew detection system as recited in claim 1, wherein the rotary sensor of each sensor package is driven by a respective drive mechanism and the first and the second printed circuit boards are static and fixed to an airframe.

6. A skew detection system as recited in claim 1, wherein the rotary sensor of each sensor package is configured to rotate more than 0 and up to 360 degrees.

7. A skew detection system as recited in claim 1, further comprising a warning system operatively connected to the processing component wherein a warning is initiated if a computed skew measurement exceeds a predefined threshold.

8. A skew detection system as recited in claim 1, wherein each sensor package further comprises dual-channel sensors, wherein the dual-channel sensors provide two independent paths for one positional measurement to improve sensor reliability through measurement redundancy.

\* \* \* \* \*